(12) United States Patent
Thompson, Jr. et al.

(10) Patent No.: US 7,320,739 B2
(45) Date of Patent: Jan. 22, 2008

(54) SOUND ABSORPTIVE MULTILAYER COMPOSITE

(75) Inventors: Delton R. Thompson, Jr., Woodbury, MN (US); Xiaohe Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 565 days.

(21) Appl. No.: 10/884,545

(22) Filed: Jul. 1, 2004

(65) Prior Publication Data

US 2004/0231915 A1 Nov. 25, 2004

Related U.S. Application Data

(63) Continuation-in-part of application No. 10/335,752, filed on Jan. 2, 2003.

(51) Int. Cl.
*B32B 37/00* (2006.01)
(52) U.S. Cl. .................. 156/308.2; 156/196; 181/286; 181/291
(58) Field of Classification Search ............ 156/308.2, 156/309.6, 324, 196; 181/286, 290, 291, 181/292
See application file for complete search history.

(56) References Cited

U.S. PATENT DOCUMENTS

| | | | |
|---|---|---|---|
| 2,803,656 A | 8/1957 | Ahlbrecht et al. | |
| 3,536,710 A | 10/1970 | Bartlett | |
| 3,542,638 A | 11/1970 | Kenney | |
| 3,692,618 A | 9/1972 | Dorschner et al. | |
| 3,802,817 A | 4/1974 | Matsuki et al. | |
| 3,849,241 A | 11/1974 | Butin et al. | |
| 3,855,046 A | 12/1974 | Hansen et al. | |
| 3,881,569 A | 5/1975 | Evans, Jr. | |
| 3,932,328 A | 1/1976 | Korpman | |
| 4,041,203 A | 8/1977 | Brock et al. | |
| 4,081,415 A | 3/1978 | Matubara et al. | |

(Continued)

FOREIGN PATENT DOCUMENTS

CA 2350477 5/2000

(Continued)

OTHER PUBLICATIONS

M. Schwartz and E. J. Gohmann, Jr., "Influence of Surface Coatings on Impedance and Absorption of Urethane Foams", J. Acoust. Soc. Am., 34 (4): 502-513 (Apr. 1962).

(Continued)

*Primary Examiner*—John L Goff
(74) *Attorney, Agent, or Firm*—Kenneth B. Wood (57) ABSTRACT

A sound absorptive multilayer composite having an air-impermeable barrier, an air-permeable reinforcing core having an airflow resistance of at least about 100 mks Rayls and a thickness at least about ⅓ the final composite thickness, an air-permeable open cell foam or fibrous pad having an airflow resistance less than about 2000 mks Rayls and a thickness at least about 1/10 the final composite thickness and a semipermeable airflow-resistive membrane having an airflow resistance of about 500 to about 4000 mks Rayls can provide improved acoustic performance. For example, existing vehicular headliner designs may be improved by adding a properly chosen and properly positioned semipermeable airflow-resistive membrane, a properly chosen and properly positioned air-impermeable barrier, or a properly chosen and properly positioned open cell foam layer.

17 Claims, 7 Drawing Sheets

U.S. PATENT DOCUMENTS

| | | | |
|---|---|---|---|
| 4,111,081 | A | 9/1978 | Hilliard et al. |
| 4,112,164 | A * | 9/1978 | Koss .................... 428/116 |
| 4,242,398 | A | 12/1980 | Segawa et al. |
| 4,283,457 | A | 8/1981 | Kolsky et al. |
| 4,291,079 | A | 9/1981 | Hom |
| 4,307,143 | A | 12/1981 | Meitner |
| 4,313,524 | A | 2/1982 | Rose |
| 4,340,563 | A | 7/1982 | Appel et al. |
| 4,346,782 | A | 8/1982 | Böhm |
| 4,374,888 | A | 2/1983 | Bornslaeger |
| 4,404,256 | A | 9/1983 | Anand et al. |
| 4,420,526 | A | 12/1983 | Schilling et al. |
| 4,421,811 | A | 12/1983 | Rose et al. |
| 4,451,589 | A | 5/1984 | Morman et al. |
| 4,476,183 | A | 10/1984 | Holtrop et al. |
| 4,488,928 | A | 12/1984 | Ali Khan et al. |
| 4,579,764 | A | 4/1986 | Peoples et al. |
| 4,692,370 | A | 9/1987 | Reckziegel et al. |
| 4,707,398 | A | 11/1987 | Boggs |
| 4,828,910 | A | 5/1989 | Haussling |
| 4,837,067 | A | 6/1989 | Carey, Jr. et al. |
| 4,851,283 | A | 7/1989 | Holstrop et al. |
| 5,025,052 | A | 6/1991 | Crater et al. |
| 5,041,304 | A | 8/1991 | Kusano et al. |
| 5,064,802 | A | 11/1991 | Stevens et al. |
| 5,073,436 | A | 12/1991 | Antonacci et al. |
| 5,094,318 | A | 3/1992 | Maeda et al. |
| 5,108,820 | A | 4/1992 | Kaneko et al. |
| 5,149,576 | A | 9/1992 | Potts et al. |
| 5,153,157 | A | 10/1992 | Hlatky et al. |
| 5,169,706 | A | 12/1992 | Collier, IV et al. |
| 5,178,931 | A | 1/1993 | Perkins et al. |
| 5,204,429 | A | 4/1993 | Kaminsky et al. |
| 5,213,881 | A | 5/1993 | Timmons et al. |
| 5,248,719 | A | 9/1993 | Kehr et al. |
| 5,272,236 | A | 12/1993 | Lai et al. |
| 5,278,272 | A | 1/1994 | Lai et al. |
| 5,298,694 | A | 3/1994 | Thompson et al. |
| 5,332,613 | A | 7/1994 | Taylor et al. |
| 5,336,552 | A | 8/1994 | Strack et al. |
| 5,374,696 | A | 12/1994 | Rosen et al. |
| 5,380,778 | A | 1/1995 | Buckanin |
| 5,382,400 | A | 1/1995 | Pike et al. |
| 5,451,450 | A | 9/1995 | Erderly et al. |
| 5,459,291 | A | 10/1995 | Haines et al. |
| 5,493,081 | A | 2/1996 | Manigold |
| 5,504,282 | A | 4/1996 | Pizzirusso et al. |
| 5,536,556 | A | 7/1996 | Juriga |
| 5,539,056 | A | 7/1996 | Yang et al. |
| 5,539,124 | A | 7/1996 | Etherton et al. |
| 5,549,776 | A | 8/1996 | Juriga |
| 5,554,775 | A | 9/1996 | Krishnamurti et al. |
| 5,565,259 | A | 10/1996 | Juriga |
| 5,569,344 | A * | 10/1996 | Grimnes .................... 156/90 |
| 5,596,052 | A | 1/1997 | Resconi et al. |
| 5,677,027 | A | 10/1997 | Masuda et al. |
| 5,681,963 | A | 10/1997 | Liss |
| 5,684,278 | A | 11/1997 | Yasukawa et al. |
| 5,736,465 | A | 4/1998 | Stahl et al. |
| 5,749,993 | A | 5/1998 | Denney et al. |
| 5,773,375 | A | 6/1998 | Swan et al. |
| 5,789,491 | A | 8/1998 | Liss et al. |
| 5,804,262 | A | 9/1998 | Stevens et al. |
| 5,824,973 | A | 10/1998 | Haines et al. |
| 5,841,081 | A | 11/1998 | Thompson et al. |
| 5,858,515 | A | 1/1999 | Stokes et al. |
| 5,866,235 | A | 2/1999 | Fredrick et al. |
| 5,869,562 | A | 2/1999 | Lindquist et al. |
| 5,886,306 | A | 3/1999 | Patel |
| 5,898,046 | A | 4/1999 | Raiford et al. |
| RE36,323 | E | 10/1999 | Thompson et al. |
| 5,961,904 | A | 10/1999 | Swan et al. |
| 6,057,254 | A | 5/2000 | Bender et al. |
| 6,057,256 | A | 5/2000 | Krueger et al. |
| 6,145,617 | A | 11/2000 | Alts |
| 6,150,287 | A | 11/2000 | Boyd et al. |
| 6,174,964 | B1 | 1/2001 | Jariwala et al. |
| 6,214,456 | B1 | 4/2001 | Boyd et al. |
| 6,217,691 | B1 | 4/2001 | Vair, Jr. et al. |
| 6,238,507 | B1 | 5/2001 | Jones et al. |
| 6,270,608 | B1 | 8/2001 | Vair, Jr. et al. |
| 6,284,843 | B1 | 9/2001 | Jariwala et al. |
| 6,288,149 | B1 | 9/2001 | Kroll |
| 6,288,157 | B1 | 9/2001 | Jariwala et al. |
| 6,296,075 | B1 | 10/2001 | Gish et al. |
| 6,345,688 | B1 | 2/2002 | Veen et al. |
| 6,358,592 | B2 | 3/2002 | Vair, Jr. et al. |
| 6,376,396 | B1 | 4/2002 | Thorn et al. |
| 6,391,807 | B1 | 5/2002 | Jariwala et al. |
| 6,410,084 | B1 | 6/2002 | Klare et al. |
| 6,446,691 | B1 | 9/2002 | Maldonado et al. |
| 6,454,048 | B1 | 9/2002 | Alts et al. |
| 6,461,133 | B1 | 10/2002 | Lake et al. |
| 6,474,967 | B1 | 11/2002 | Haynes et al. |
| 6,524,691 | B2 | 2/2003 | Sugawara et al. |
| 6,575,527 | B1 | 6/2003 | Bishop, Jr. |
| 6,576,577 | B1 | 6/2003 | Garner |
| 6,616,789 | B2 | 9/2003 | Price et al. |
| 6,619,947 | B2 | 9/2003 | Maldonado et al. |
| 6,631,785 | B2 | 10/2003 | Khambete et al. |
| 6,632,386 | B2 | 10/2003 | Shelley et al. |
| 6,635,329 | B1 | 10/2003 | Arndt et al. |
| 6,659,223 | B2 | 12/2003 | Allison et al. |
| 6,669,265 | B2 | 12/2003 | Tilton et al. |
| 6,676,195 | B1 | 1/2004 | Marriott et al. |
| 6,720,068 | B1 | 4/2004 | Vanbemmel et al. |
| 6,726,980 | B2 | 4/2004 | Staelgraeve et al. |
| 6,736,181 | B2 | 5/2004 | McNeely et al. |
| 6,737,114 | B2 | 5/2004 | Dawson, Jr. et al. |
| 6,753,380 | B2 | 6/2004 | Qiu |
| 6,756,332 | B2 | 6/2004 | Sandoe et al. |
| 6,808,786 | B2 | 10/2004 | Theiss |
| 6,983,822 | B2 | 1/2006 | O'Regan et al. |
| 2001/0036788 | A1 | 11/2001 | Sandoe et al. |
| 2002/0160682 | A1 | 10/2002 | Zeng |
| 2003/0003267 | A1 | 1/2003 | Alts et al. |
| 2003/0066708 | A1 | 4/2003 | Allison et al. |
| 2003/0087103 | A1 | 5/2003 | Belmares et al. |
| 2003/0104192 | A1 | 6/2003 | Hester et al. |
| 2003/0104749 | A1 | 6/2003 | Emirze et al. |
| 2003/0116379 | A1 | 6/2003 | Khambete et al. |
| 2003/0118816 | A1 | 6/2003 | Polanco et al. |
| 2003/0148096 | A1 | 8/2003 | Groten et al. |
| 2003/0199216 | A1 | 10/2003 | Gomez et al. |
| 2003/0203687 | A1 | 10/2003 | Akuzawa |
| 2004/0023014 | A1 | 2/2004 | Williamson et al. |
| 2004/0037995 | A1 | 2/2004 | Nicolai et al. |
| 2004/0077247 | A1 | 4/2004 | Schmidt et al. |
| 2004/0100125 | A1 | 5/2004 | Ogawa et al. |
| 2004/0151870 | A1 | 8/2004 | Theiss |

FOREIGN PATENT DOCUMENTS

| | | |
|---|---|---|
| CA | 2 393 305 A1 | 6/2001 |
| DE | 8804962 U | 7/1988 |
| DE | 10126306 A | 1/2002 |
| DE | 10110533 A | 9/2002 |
| DE | 20309151 U1 | 12/2003 |
| EP | 0181627 A2 | 5/1986 |
| EP | 0635086 B1 | 1/1995 |
| EP | 0 648 602 A1 | 4/1995 |
| EP | 0 755 325 B1 | 9/2001 |
| EP | 1 312 655 A2 | 5/2003 |
| EP | 1 321 554 A1 | 6/2003 |

| | | |
|---|---|---|
| EP | 1 342 561 A1 | 9/2003 |
| EP | 1 058 618 | 2/2004 |
| EP | 1 233 886 B1 | 2/2004 |
| GB | 1522922 | 9/1979 |
| GB | 2146289 A | 4/1985 |
| JP | 63215446 A | 9/1988 |
| JP | 9-76387 | 3/1997 |
| JP | 09144161 A | 6/1997 |
| JP | 11327566 A | 11/1999 |
| JP | 11350363 A | 12/1999 |
| JP | 2000096734 A | 4/2000 |
| JP | 2000238157 A | 9/2000 |
| JP | 3129098 B2 | 1/2001 |
| JP | 2001055657 A | 2/2001 |
| JP | 2001064859 A | 3/2001 |
| JP | 2001279567 A | 10/2001 |
| JP | 2002069823 A | 3/2002 |
| JP | 2002069824 A | 3/2002 |
| WO | WO82/00266 | 2/1982 |
| WO | WO90/12168 | 10/1990 |
| WO | WO 92/13339 | 8/1992 |
| WO | WO93/21402 | 10/1993 |
| WO | WO95/00362 | 1/1995 |
| WO | WO98/58796 | 12/1998 |
| WO | WO99/44817 A1 | 9/1999 |
| WO | WO00/27671 | 5/2000 |
| WO | WO00/47313 | 8/2000 |
| WO | WO 01/40025 A1 | 6/2001 |
| WO | WO 01/48506 A3 | 7/2001 |
| WO | WO 01/49531 | 7/2001 |
| WO | WO01/64991 A2 | 9/2001 |
| WO | WO01/64991 A3 | 9/2001 |
| WO | WO 02/04730 | 1/2002 |
| WO | WO 02/09089 | 1/2002 |
| WO | WO02/20307 A1 | 3/2002 |
| WO | WO 02/072537 | 9/2002 |
| WO | WO 02/072657 | 9/2002 |
| WO | WO 02/094616 | 11/2002 |
| WO | WO03/046270 A2 | 6/2003 |
| WO | WO 03/057465 | 7/2003 |
| WO | WO 03/065345 | 8/2003 |
| WO | WO 03/089731 | 10/2003 |
| WO | WO 2004/012889 | 2/2004 |
| WO | WO 2004/013395 | 2/2004 |
| WO | WO2004/030903 A2 | 4/2004 |
| WO | WO 2004/038116 | 5/2004 |
| WO | WO 2004/060657 | 7/2004 |
| WO | WO 2004/088025 A1 | 10/2004 |

OTHER PUBLICATIONS

M. Schwartz and W. L. Buehner, "Effects of Light Coatings on Impedance and Absorption of Open-Celled Foams", J. Acoust. Soc. Am., 35 (10): 1507-1510 (Oct. 1963).
Azdel, "Thermoplastic Composites Guide to AZDEL SuperLite®", publication of AZDEL, Inc. available on the Internet at http://www.azdel.com/documents/Guide%20to%20AZDEL%20SuperLite.pdf.
U.S. Appl. No. 10/335,752, filed Jan. 2, 2003, Delton R. Thompson, Jr.
U.S. Appl. No. 10/884,544, filed Jul. 1, 2004, Delton R. Thompson, Jr. et al.
"*Azdel Thermoplastic Composites Company Guide*", dated Jan. 1, 2004, pp. 1-80, downloaded from the Azdel.com website on Jun. 16, 2005 at: http://www.azdel.com/documents/companyguide.pdf.
THINSULATE™ Acoustic Insulation technical data sheet.
ASTM Designation: F 778-88 (Reapproved 2001), "Standard Methods for Gas Flow Resistance Testing of Filtration Media", Jan. 29, 1988, pp. 1404-1418.
Method 5450, Federal Test method Standard No. 191A, "Permeability to Air; Cloth; Calibrated Orifice Method", Jul. 1978.
U.S. Appl. No. 60/292,345, filed May 22, 2001, entitled "Sound Absorptive Protective Mat".
"Modification of Chemical Fiber Surface with Fluorine Containing Co-Polymer", Organic Fluorine Industry, No. 3, 1996, pp. 48-51.
THINSULATE™ Acoustic Insulation technical data sheet, 2004.

\* cited by examiner

SOUND ABSORPTIVE MULTILAYER COMPOSITE

CROSS-REFERENCE TO RELATED APPLICATION

This application is a continuation-in-part of copending U.S. patent application Ser. No. 10/335,752 filed Jan. 2, 2003, entitled ACOUSTIC WEB, the entire disclosure of which is incorporated by reference herein.

FIELD OF THE INVENTION

This invention relates to sound absorptive multilayer composites, and to precursor components and methods for the preparation or such composites.

BACKGROUND

Multilayer composite articles are sometimes used to absorb sound and thereby reduce noise levels in nearby spaces. For example, sound absorptive multilayer composites may be employed in headliners, trunk liners, hood liners, dash mats, interior panels, carpeting and other porous decorative or functional vehicular facing materials to provide enhanced noise reduction in a vehicle interior.

References relating to acoustic insulation, vehicular facings or noise reduction include U.S. Pat. Nos. 5,459,291, 5,536,556, 5,549,776, 5,565,259, 5,824,973, 6,145,617, 6,150,287, 6,214,456 B1, 6,217,691 B1, 6,238,507 B1, 6,270,608 B1, 6,296,075 B1, 6,345,688 B1, 6,454,088 B1, 6,575,527 B1, 6,576,577 B1, 6,616,789 B2, 6,631,785 B2 and 6,659,223 B2; U.S. Published Patent Application Nos. US 2001/0036788 A1, US 2003/10479 A1 and US 2004/037995 A1; Canadian Published Application No. 2,350,477 A1; PCT Published Application Nos. WO 99/44817 A1 and WO 01/64991 A2; M. Schwartz and E. J. Gohmann, Jr., "Influence of Surface Coatings on Impedance and Absorption of Urethane Foams, J. Acoust. Soc. Am., 34 (4): 502-513 (April, 1962); M. Schwartz and W. L. Buehner, "Effects of Light Coatings on Impedance and Absorption of Open-Celled Foams, J. Acoust. Soc. Am., 35 (10): 1507-1510 (October, 1963); and "Guide to AZDEL SuperLite", publication of AZDEL, Inc. available on the Internet at http://www.azdel.com/documents/Guide%20to%20AZDEL%20SuperLite.pdf.

SUMMARY OF THE INVENTION

The design of headliners and other sound absorptive multilayer composites requires balancing a number of sometimes competing factors including thickness, weight, acoustic performance and manufacturability. Acoustic performance can be greatly assisted by placing a semipermeable airflow-resistive membrane at or very close to the headliner's passenger or occupant side and an air-impermeable film at or very close to the headliner's roof or vehicle side. In many current headliner designs this has not been done, and consequently the designs may have suboptimal acoustic performance. By rearranging the layers in some headliner designs or by adding a properly chosen and properly positioned semipermeable airflow-resistive membrane, a properly chosen and properly positioned air-impermeable barrier, or a properly chosen and properly positioned open cell foam layer, we have obtained significant improvements in acoustic performance. Doing so may impose no or a very low additional thickness or weight penalty, and may audibly reduce vehicular interior noise levels.

The present invention provides, in one aspect, a sound absorptive multilayer composite comprising in order:
  a) a semipermeable airflow-resistive membrane having an airflow resistance of about 500 to about 4000 mks Rayls,
  b) an air-permeable open cell foam or fibrous pad having an airflow resistance less than about 2000 mks Rayls and a thickness at least about $\frac{1}{10}$ the total composite thickness,
  c) an air-permeable reinforcing core having an airflow resistance of at least about 100 mks Rayls and a thickness at least about $\frac{1}{3}$ the total composite thickness, and
  d) an air-impermeable barrier.

The invention also provides a roll good comprising a spirally-wound porous laminate preform comprising a semipermeable airflow-resistive membrane having an airflow resistance of about 500 to about 4000 mks Rayls, adhered to an air-permeable open cell foam or fibrous pad having an airflow resistance less than about 2000 mks Rayls and a thickness of at least about 1 mm.

The invention also provides a roll good comprising a spirally-wound porous laminate preform comprising a non-restrictive air-permeable decorative woven or nonwoven fabric layer, adhered to a semipermeable airflow-resistive membrane having an airflow resistance of about 500 to about 4000 mks Rayls, adhered to an air-permeable open cell foam or fibrous pad having an airflow resistance less than about 2000 mks Rayls and a thickness of at least about 1 mm, adhered to a thermoplastic adhesive layer.

The invention also provides a method for making a multilayer sound absorptive composite comprising:
  a) providing a stack of layers comprising in order an air-impermeable barrier, an air-permeable reinforcing core having an airflow resistance of at least about 100 mks Rayls and a thickness at least about $\frac{1}{3}$ the final composite thickness, an air-permeable open cell foam or fibrous pad having an airflow resistance less than about 2000 mks Rayls and a thickness at least about $\frac{1}{10}$ the final composite thickness, and a semipermeable airflow-resistive membrane having an airflow resistance of about 500 to about 4000 mks Rayls, and
  b) laminating the stack of layers together under sufficient heat and pressure to form a unitary sound absorptive multilayer composite.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Like reference symbols in the various figures of the drawing indicate like elements. The elements in the drawing are not to scale.

DETAILED DESCRIPTION

When used with respect to a multilayer composite, the phrase "occupant side" refers to a side of the composite that if employed to absorb sound in a vehicle interior would normally be nearest the vehicle occupants. The phrase "vehicle side" refers to a side of the composite that if so employed would normally be furthest from the vehicle occupants.

When used with respect to a layer (e.g., a membrane, foam, pad, adhesive, reinforcing core or fabric) of a multilayer sound absorptive composite, the phrase "air-permeable" refers to a layer that can permit the passage of sufficient air through the layer so that the composite can absorb sound in a frequency band of interest in a vehicle interior.

When air permeability values for a component (e.g., a membrane, foam, pad, reinforcing core, barrier or fabric) of a multilayer sound absorptive composite are expressed using values in mks Rayls, the recited values may be determined according to ASTM C522 and by measuring the component in place, or carefully removed from, the finished composite. In some instances such values may be deduced or otherwise determined based on the measured airflow resistance of the finished composite or one or more individual or aggregate components.

When used with respect to a barrier, the word "impermeable" refers an air-permeable film, foil or other substantially non-porous article whose airflow resistance is at least about 100,000 mks Rayls.

When used with respect to an air-permeable decorative layer, the word "nonrestrictive" refers to a layer whose airflow resistance is less than about 100 mks Rayls.

When used with respect to a multilayer composite containing an air-permeable core and an open cell foam or fibrous pad, the phrase "reinforcing core" refers to a core having a stiffness at least twice that of the foam or fibrous pad when evaluated using ASTM D1388, Option A—Cantilever Test.

When used with respect to a multilayer composite, the word "unitary" refers to a composite whose layers adhere together sufficiently so that the composite can normally be cut to fit as needed and installed in a vehicle without objectionable delamination.

Figure 1:
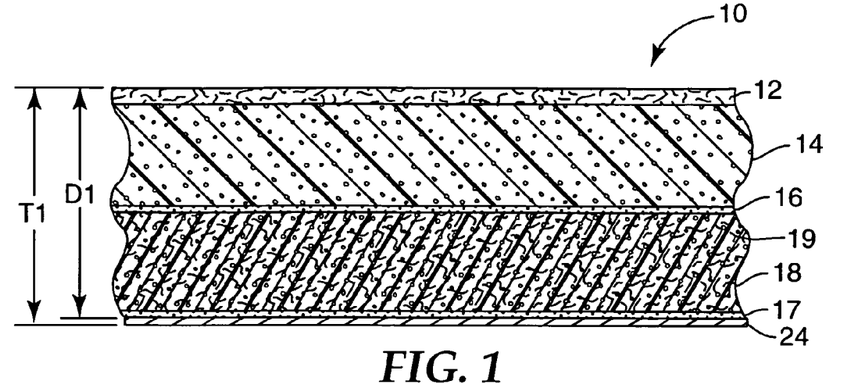
FIG. 1 is a side sectional view of a disclosed sound absorptive composite.

FIG. 1 is a schematic side sectional view of a multilayer sound absorptive composite 10. Semipermeable airflow-resistive membrane 12 is colored and textured to provide a decorative appearance, and forms the outermost occupant side layer of composite 10. Decorative membrane 12 limits airflow into composite 10 and may have higher airflow resistance per unit of thickness (viz., higher resistivity) than the other air-permeable components of composite 10. Barrier 24 prevents air from flowing through composite 10 and forms the outermost vehicle side layer of composite 10. The cavity having depth D1 between the outermost surface of membrane 12 and the innermost surface of barrier 24 forms a sound absorbing space whose acoustic effectiveness is maximized by placing membrane 12 and barrier 24 at opposing outermost surfaces of composite 10 and thus maximizing cavity depth D1 as a percentage of the overall composite thickness T1. Membrane 12 is adhered via flame-lamination to air-permeable open cell polyethylene foam 14. Foam 14 is adhered via air-permeable thermoplastic adhesive layer 16 to reinforcing core 18. Core 18 contains a resin-saturated open cell foam structure filled with chopped fiberglass strands 19. Core 18 is adhered via air-permeable thermoplastic adhesive layer 17 to air-impermeable film barrier 24. Core 18 provides overall stiffness to composite 10, and enables composite 10 to span long distances (e.g., vehicular roof areas) without objectionably sagging.

Figure 2:
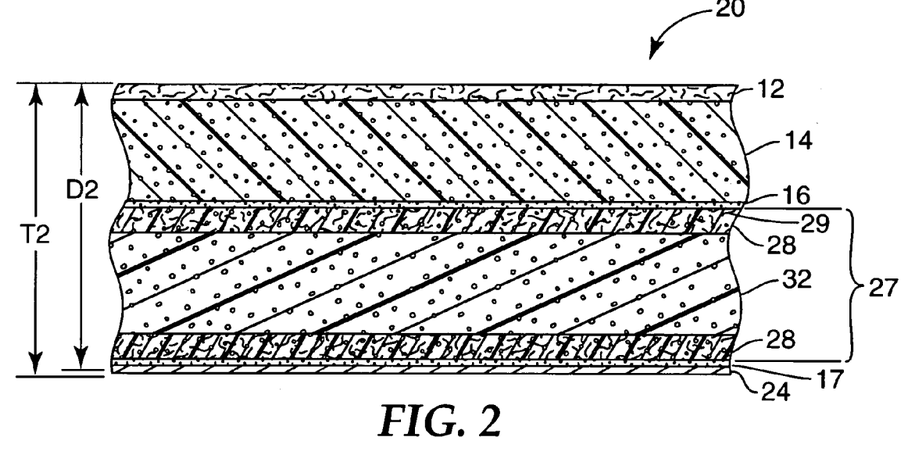
FIG. 2 is a side sectional view of another disclosed sound absorptive composite.

FIG. 2 is a schematic side sectional view of a multilayer sound absorptive composite 20. Composite 20 is similar to composite 10 except for its use of reinforcing core 27 in place of core 18 and its somewhat greater cavity depth D2 and composite thickness T2 arising from the greater thickness of core 27 compared to core 18. Core 27 has outer fiberglass mat layers 28 (containing strands 29 ) on either side of central open cell foam layer 32, forming an "I-beam" structure somewhat analogous to lumber core plywood.

Figure 3:
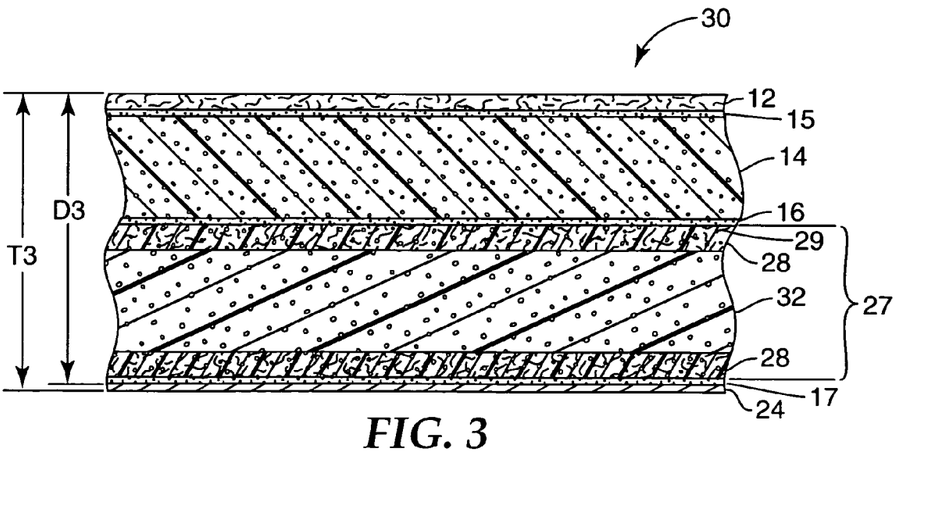
FIG. 3 is a side sectional view of another disclosed sound absorptive composite.

FIG. 3 is a schematic side sectional view of a multilayer sound absorptive composite 30. Composite 30 is similar to composite 20 except for its use of an air-permeable thermoplastic adhesive layer 15 between membrane 12 and foam layer 14 and its somewhat greater cavity depth D3 and composite thickness T3 arising from the thickness of adhesive layer 15. Composite 30 may be made without using flame lamination to adhere membrane 12 to foam 14.

Figure 4:
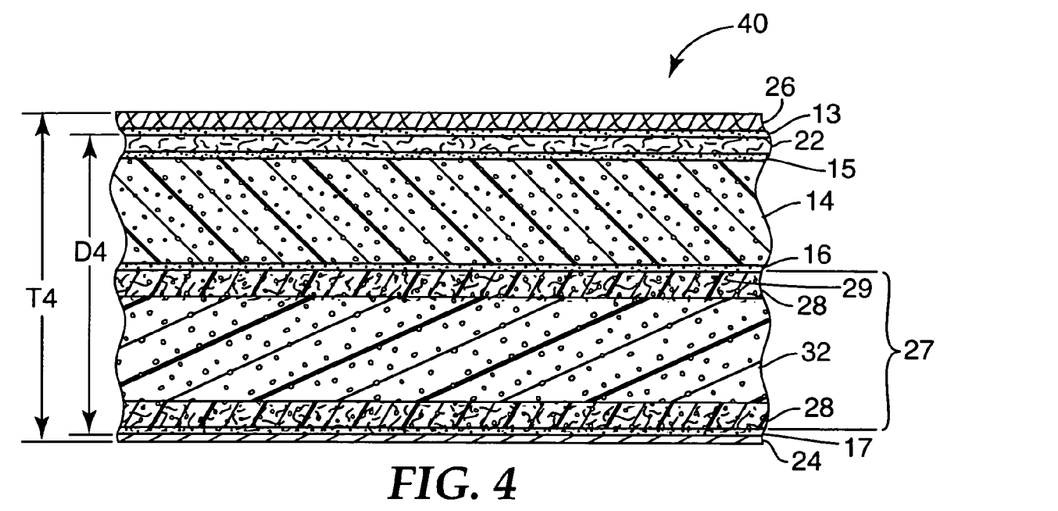
FIG. 4 is a side sectional view of another disclosed sound absorptive composite.

FIG. 4 is a schematic side sectional view of a multilayer sound absorptive composite 40. Composite 40 is similar to composite 30 but has a nonrestrictive air-permeable decorative fabric layer 26, adhesive layer 13 and semipermeable airflow-resistive membrane 22 in place of semipermeable airflow-resistive decorative membrane 12. Composite 40 also has a somewhat greater composite thickness T4 arising from the thickness of fabric 26 and adhesive layer 13. Fabric 26 is located at the outermost occupant side of composite 10 and is separated by only adhesive layer 13 from membrane 22. Membrane 22 need not be decorative, and may omit coloration, texturing or other measures that might be employed were membrane 22 normally visible to vehicle occupants. Membrane 22 is adhered to foam layer 14 via air-permeable thermoplastic adhesive layer 15. The ratio of the cavity depth D4 to composite thickness T4 is not as large as is the case for a composite such as composite 30 whose outermost occupant side has a decorative semipermeable airflow-resistive membrane. However, the ratio is larger than that found in typical headliner designs that may employ an open cell foam layer between a decorative fabric facing and an underlying semipermeable airflow-resistive membrane.

Figure 5:
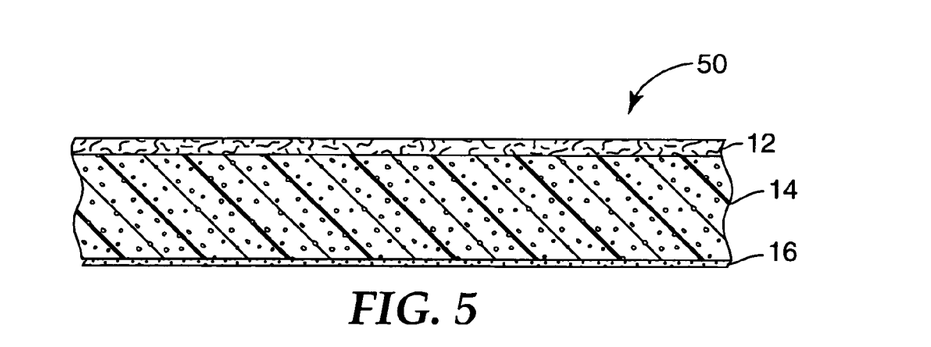
FIG. 5 is a side sectional view of a porous laminate.

FIG. 5 is a schematic side sectional view of a porous laminate 50 that may be used to form a porous laminate roll good having particular utility in making the disclosed multilayer sound absorptive composites. Semipermeable airflow-resistive decorative membrane 12 and open cell foam layer 14 are adhered together using flame lamination. The vehicle side of porous laminate 50 includes thermoplastic adhesive layer 16. Layer 16 is air permeable, or will become so after being heated to join foam 14 to a reinforcing core (not shown in FIG. 5). The reinforcing core's stiffness may prevent it from being processed as a roll good. Laminate 50 may however be relatively flexible and may be rolled up and stored or shipped as needed, then combined with a reinforcing core at another time or another location. Laminate 50 may if desired include an optional nonrestrictive air-permeable decorative layer such as a layer of fabric (not shown in FIG. 5), joined to membrane 12 using flame lamination or a suitable adhesive.

Figure 6:
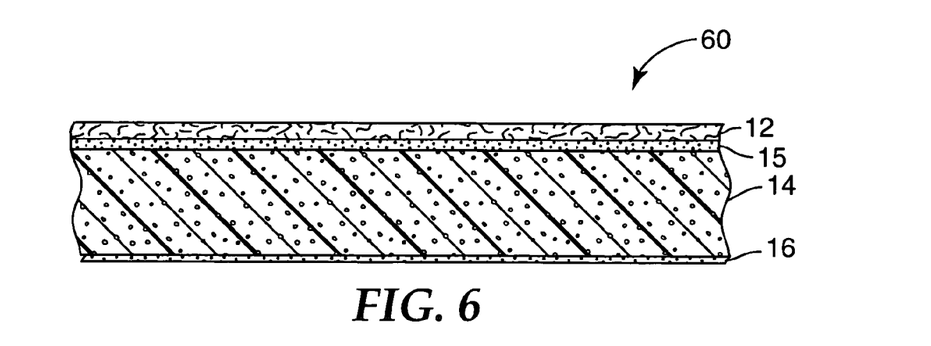
FIG. 6 is a side sectional view of another porous laminate.

FIG. 6 is a schematic side sectional view of another porous laminate 60 that may be used to make the disclosed multilayer sound absorptive composites. Laminate 60 is similar to laminate 50 but employs air-permeable thermoplastic adhesive layer 15 to adhere membrane 12 to foam layer 14. Laminate 60 may if desired include an optional nonrestrictive air-permeable decorative layer such as a layer of fabric (not shown in FIG. 6), joined to membrane 12 using flame lamination or a suitable adhesive A variety of airflow-resistive membranes may be used in the disclosed multilayer composites. The membrane may be formed, for example, from fibrous precursors such as synthetic fibers, natural fibers or blends of synthetic and natural fibers and processed into a nonwoven web using meltblowing, spunbonding or other suitable web processing techniques that will provide a finished semipermeable open structure having an airflow resistance of about 500 to about 4000 mks Rayls. The membrane may also be formed from microdenier continuous filament or staple fiber yarns (viz., yarns having a denier per filament (dpf) less than about 1, e.g., between about 0.2 and about 1 dpf) and processed into a woven or knit fabric using suitable processing techniques to provide a finished semipermeable open structure having an airflow resistance of about 500 to about 4000 mks Rayls. Preferably the membrane airflow resistance is about 500 to about 2000 mks Rayls. The membrane may for example be less than about ⅕ the total composite thickness, e.g., less than about 1/10 the total composite thickness. For a headliner having a typical total thickness between about 5 and about 20 mm, the membrane may for example be less than about 4 mm, e.g., preferably less than about 1 mm thick. Membranes made from microdenier continuous or staple synthetic fibers, and especially synthetic fibers that are split or splittable, may be preferred. Suitable synthetic fibers include multicomponent (e.g., bicomponent) fibers such as side-by-side, sheath-core, segmented pie, islands in the sea, tipped and segmented ribbon fibers. Splitting may be carried out or encouraged using a variety of techniques that will be familiar to those skilled in the art including carding, air jets, embossing, calendering, hydroentangling or needle punching. The membrane may be decorative or non-decorative, with decorative membranes being preferred when the membrane will normally be visible to vehicle occupants and non-decorative membranes being preferred when the membrane will normally not be visible to occupants. Thus for a headliner a decorative membrane will be preferred when the membrane is the outermost occupant side layer. A non-decorative membrane may be employed in a headliner in which a decorative fabric is the outermost occupant side layer and covers the membrane. Decorative membranes may be processed in a variety of ways to alter or improve the membrane's appearance, tactile properties (e.g., hand), physical properties (e.g., stiffness or drape) and other desired characteristics. Such processing techniques include pigmentation, dyeing, impregnation, immersion, coating, calendering, stretching, embossing, corrugation, brushing, grinding, flocking and other treatments or steps that will be familiar to those skilled in the art. If desired more than one membrane may be employed in the composite, and if so the various membranes may be the same or different with at most only an outermost occupant side membrane being decorative. The membrane preferably has an elongation to break sufficient to enable the composite to survive deep cavity molding without objectionable delamination, rupture or adverse permeability changes. A preferred membrane elongation to break is at least about 5% and more preferably at least about 20%. The membrane also preferably has a thermal resistance sufficient to withstand the rigors of the high temperature molding processes that may be employed in manufacturing vehicular headliners and other multilayer sound absorptive composites. Thus it may be preferred to avoid using membranes containing extensive amounts of low-melting polyolefins or other materials that might cause an objectionable air-permeability change (e.g., a substantial decrease) during a molding cycle. The membrane may be treated as described in the above-mentioned application Ser. No. 10/335,752 so that it has a low surface energy, e.g., less than that of an adjacent thermoplastic adhesive layer (if employed), for example less than about 34 dynes/cm$^2$, preferably less than about 30 dynes/cm$^2$, and more preferably less than about 28 dynes/cm$^2$. Lightweight membranes having basis weights less than 300 g/m$^2$ are especially preferred, more preferably less than about 200 g/m$^2$ and most preferably from about 100 to about 200 g/m$^2$. Stiff or flexible membranes may be employed. For example, the membrane may have a bending stiffness B as low as 0.005 Nm or less when measured according to ASTM D1388 using Option A—Cantilever Test. The selection and processing of suitable membrane materials will be familiar to those skilled in the art. Representative membranes or fibers for use in such membranes are disclosed in U.S. Pat. Nos. 5,459,291, 5,824,973, 6,057,256 and 6,145,617; U.S. Published Patent Application Nos. US 2001/0036788 A1 and US 2003/0104749 A1; Canadian Published Application No. 2,350,477 A1; and PCT Published Application No. WO 99/44817 A1. Representative commercially available membranes or fibers include EVO-LON™ fabric (commercially available from Freudenberg & Co.); Nos. T-502, T-512 and T-522 segmented splittable bicomponent fibers from Fiber Innovation technology, Inc.; microdenier woven or warp knit fabrics from Guilford Mills, Inc.; splittable bicomponent fibers from Kanebo Ltd., Kuraray Co. Ltd. and Unitika Ltd. and splittable bicomponent fibers and fabrics from Toray Industries, Inc.

A variety of open cell foams or fibrous pads may be employed in the disclosed composites. As noted above the foam or pad has an airflow resistance less than about 2000 mks Rayls. Preferably the foam or pad has an airflow resistance less than about 1000 mks Rayls and more preferably less than about 500 mks Rayls. As also noted above, the foam or pad thickness is at least about 1/10 the total composite thickness. Preferably the foam or pad is at least about ¼ and more preferably at least about ⅓ the total composite thickness. For example, for a headliner having a typical total thickness between about 5 and about 20 mm, the foam or pad may for example be at least about 0.5 mm thick and may be much thicker, e.g., at least about 2 mm thick or at least about 5 mm thick. Such foams or pads may also be for example less than about 13 mm thick, e.g., less than about 10 mm thick. The foam or pad may have lower airflow resistance per unit of thickness (viz., lower resistivity) and lower density than the other air-permeable non-adhesive components in the multilayer composite. The foam or pad preferably has a thermal resistance sufficient to withstand the rigors of the molding process. Thus it may be preferred to avoid using foams or pads containing extensive amounts of low-melting polyolefins or other materials that might cause an objectionable air-permeability change (e.g., a substantial decrease) during a molding cycle. Suitable foams include open cell foams from polymers such polyurethanes, polyolefins (e.g., polyethylene), polyether urethanes and styrene-maleic anhydrides. Suitable fibrous pads include those made from natural fibers such as cotton, synthetic fibers such as polyesters (e.g., polyethylene terephthalate) used alone or in blends (e.g., with bicomponent fibers), and pads made from synthetic/natural fiber blends such as polyester/cotton blends and "shoddy". Representative commercially available foams include those from Foamex International Inc., Avery Dennison Corp. and Barnhardt Manufacturing Co. Representative commercially available fibrous pads include those from Barnhardt Manufacturing Co., Sandler AG, Foss Manufacturing Co. and Janesville Products, Inc. The foam or fibrous pad contributes to the cavity depth (e.g., the dimension D1 in FIG. 1) and the composite's overall acoustic performance without adding the additional weight or airflow resistance that might be present if the reinforcing core were merely made thicker. The resulting acoustic performance may be much better than that found in headliner designs that bury a sole semipermeable airflow-resistive membrane well inside a sound absorptive composite, e.g., by placing an open cell foam layer on the occupant side of a semipermeable airflow-resistive membrane. It may be noted that adding even a millimeter or two of foam or fibrous pad on the vehicle side of the membrane when none is already present can substantially improve acoustic performance with only a minimal weight penalty. Also, moving even a millimeter or two of foam or fibrous pad from a membrane's occupant side to its vehicle side can substantially increase cavity depth and improve acoustic performance without increasing weight or total composite thickness.

A variety of reinforcing cores may be employed in the disclosed composites. As noted above the core has an airflow resistance of at least about 100 mks Rayls. For example, the core may have an airflow resistance of about 200 to about 7000 mks Rayls. As noted above a reinforcing core has at least twice the stiffness of the open cell foam or fibrous pad. As also noted above, the core thickness is at least about ⅓ the total composite thickness. Preferably the core is less than about ⅔ and more preferably less than about ½ the total composite thickness. For example, for a headliner having a typical total thickness between about 5 and about 20 mm, the core may for example be at least about 3 mm thick. Such cores may also be for example less than about 14 mm thick, e.g., less than about 10 mm thick. The core may have higher stiffness (viz., higher modulus), higher density or higher airflow resistance than the other air-permeable components in the multilayer composite. The core preferably has a thermal resistance sufficient to withstand the rigors of the molding process. Thus it may be preferred to avoid using cores containing extensive amounts of low-melting polyolefins or other materials that might cause an objectionable air-permeability change (e.g., a substantial decrease) during a molding cycle. The core may for example have a relatively uniform structure such as is shown in FIG. 1, or an I-beam construction in which more dense skin layers flank a less dense central layer such as is shown in FIG. 2 through FIG. 4. Suitable cores include those described in U.S. Pat. Nos. 5,536,556, 5,549,776, 5,565,259, 6,150,287, 6,214,456 B1 and 6,238,507 B1 and Canadian Published Application No. 2,350,477 A1. Representative commercially available cores include AZDEL SUPERLITE™ composite from Azdel, Inc., UROCORE™ and TRU™ composites from Lear Corp. and ACOUSTICORE™ and POLYBOND™ composites from Johnson Controls, Inc.

A variety of air-impermeable barriers may be employed in the disclosed composites. The barrier may for example have a thickness less than about 2 mm, e.g., less than about 1 mm. Suitable barriers include polymeric films such as polyolefin, polyester or vinyl films and metal foils. One widely-used barrier film that includes an adhesive is INTEGRAL™ 909 adhesive film from Dow Chemical Company.

When a decorative occupant side is desired and the outermost occupant side layer is not a decorative semipermeable airflow-resistive membrane, an optional nonrestrictive air-permeable decorative layer may be employed. A variety of such nonrestrictive decorative layers may be employed. Representative nonrestrictive decorative layer materials include fabric, leather, suitably perforated metal, suitably perforated or porous plastic, and carpet. Techniques for fabricating such decorative layers will be familiar to those skilled in the art.

The membrane, foam or fibrous pad, core and barrier are adhered or laminated together to form a unitary composite. Such adhesion or lamination may be accomplished in a variety of ways, and may take place in a single step that addresses all of the layers or in a series of steps that individually address some of the layers. For example, the disclosed sound absorptive multilayer composites may conveniently be made by laying up or applying the individual composite layers in a suitable mold. The layers may be preheated if needed and then compression molded using sufficient heat and pressure to form a unitary composite. The disclosed composites may also be made using a porous laminate preform roll good such as the porous laminates shown in FIG. 5 and FIG. 6 and a suitable reinforcing core and barrier.

A variety of adhesive measures or adhesive layers may be employed as needed to promote formation of the disclosed unitary composites. For example, the membrane may conveniently be adhered to the foam or fibrous pad (and to a nonrestrictive air-permeable decorative layer, if present) using measures such as compression molding or flame lamination. The membrane may be adhered to the foam or fibrous pad and to a nonrestrictive air-permeable decorative layer, if present, using an air-permeable adhesive layer such as a thermoplastic air-permeable adhesive. The core may conveniently be adhered to a foam or fibrous pad and to the barrier using a thermoplastic air-permeable adhesive. The core may be adhered to the foam or fibrous pad by incorporating a suitable polymer in the core (e.g., a thermoplastic urethane) that will form a bond to a foam, fibrous pad or barrier upon heating. Other measures for joining together the various layers and forming a unitary composite will be apparent to those skilled in the art. The finished composite may be air quenched as needed and cut (using, for example, a water jet) to yield the desired completed parts.

A variety of thermoplastic adhesives may optionally be used in the disclosed composites. The multilayer composites may for example contain two to five adhesive layers. The various adhesive layers may be the same or different. Desirably the adhesive layers will satisfactorily bond together adjacent layers of the composite when processed using typical high temperature molding processes while maintaining adequate air-permeability, and will maintain adequate bonding strength at the expected use temperatures that may be experienced inside a vehicle (e.g., at temperatures of 70° C. or more). Preferred adhesives include copolyesters, polyesters, polyurethanes, polyamides, ethylene vinyl acetates, low density polyethylenes, atactic polypropylenes, propylene/1-butene/ethylene terpolymers, and propylene/ethylene, 1-butene/ethylene, 1-butene/propylene copolymers and copolymers of any of the foregoing. Other useful adhesives include those described in U.S. Pat. Nos. 3,932,328, 4,081,415, 4,692,370, 5,248,719, 5,869,562 and 6,288,149. The adhesive may also be a low basis weight thermoplastic scrim such as SHARNET™ hot melt adhesive web from Bostik-Findley Company. The selection and processing of such adhesives will largely be familiar to those skilled in the art. It may be noted however that although the completed multilayer composite's sound absorption characteristics will depend in large measure on the known porosity characteristics of the composite's thicker layers (e.g., those of the semipermeable airflow-resistive membrane, open cell foam and reinforcing core), the sound absorption characteristics may also depend a great deal on more process-dependent factors including the manner in which adhesive layers are applied and the chosen composite molding or laminating techniques.

The disclosed composites and roll goods may consist of or consist essentially of the recited layers. The disclosed composites and roll goods may include additional interior or exterior layers, coatings, treatments or other elements if desired. For example, the composite may include one or more reinforcing scrim layers, a vehicle side adhesive layer, fire retardant additives or treatments, antennas, and other layers, coatings treatments or elements that will be apparent to those skilled in the art.

The disclosed sound absorptive multilayer composites preferably have a cavity depth that is at least 60%, more preferably at least 80%, yet more preferably at least 90% and most preferably at least 95% of the total composite thickness. For purposes of making this comparison, the cavity depth may be measured from the air-impermeable barrier innermost side to the membrane outermost side, and the total composite thickness may be measured from the composite vehicle side to the composite occupant side. When more than one membrane is employed, the cavity depth may be measured from the air-impermeable barrier innermost side to the outermost side of the outermost membrane.

The disclosed sound absorptive multilayer composites can significantly attenuate sound waves passing into or through an interior of the vehicle. The composite is positioned at an appropriate interior location (e.g., near the roof, pillars, firewall, floor pan or door panels) so that it absorbs sound waves and reduces perceived noise levels.

The invention is further illustrated in the following illustrative examples, in which all parts and percentages are by weight unless otherwise indicated.

EXAMPLE 1 AND COMPARISON EXAMPLE M

A semipermeable airflow-resistive decorative membrane was prepared using 6 denier by 51 mm splittable bicomponent staple fibers having a segmented pie cross-sectional structure with alternating polyethylene terephthalate and nylon 6 segments (Type T-502 fibers from Fiber Innovation Technology, Inc.). The web was resin-bonded and pigmented to provide a dark grey coloration, and carded and hydroentangled to split and interlock the fibers. The finished web had a 0.6 mm thickness and an airflow resistance of 1,327 mks Rayls as measured using ASTM C-522.

Figure 9:
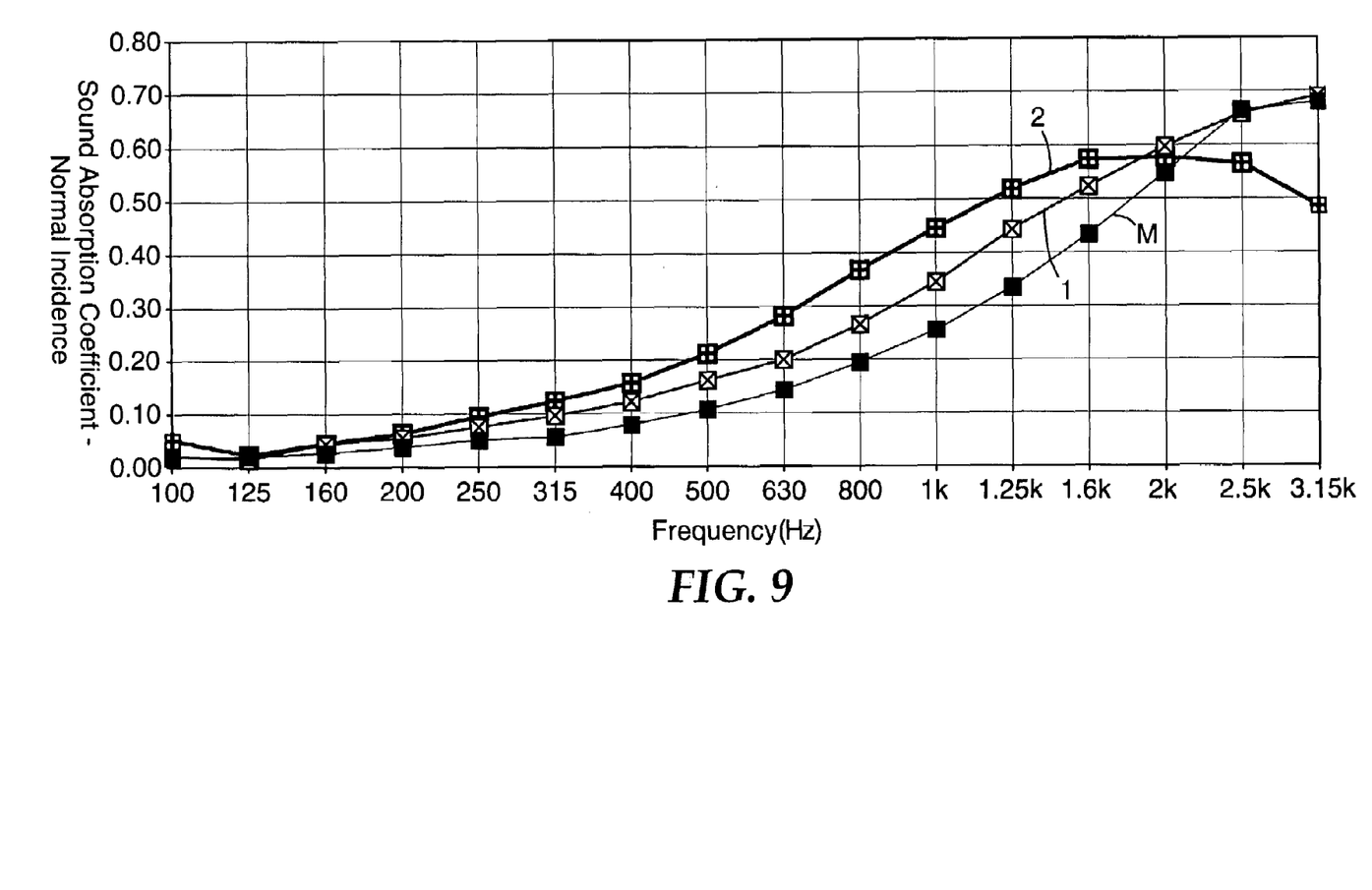
FIG. 9 is a graph of sound absorption vs. frequency for the Example 1, Example 2 and Comparison Example M sound absorptive composites.

The automotive headliner used in a U.S. manufactured European luxury sport utility vehicle was obtained from the vehicle manufacturer. The headliner had an 11.1 mm thickness. A 63.5 mm diameter cylindrical sample was cut from the finished part, identified as Comparison Example M and evaluated for sound absorption at normal incidence in accordance with ASTM E-1050. The absorption test was performed from 100 Hz to 3.15 KHz with the sample positioned in a midsize (63 mm diameter) impedance tube so that the facing fabric side was incident to the noise source and so that there was no air cavity behind the sample's vehicle side. The sound absorption results are shown as Curve M in FIG. 9.

Figure 7:
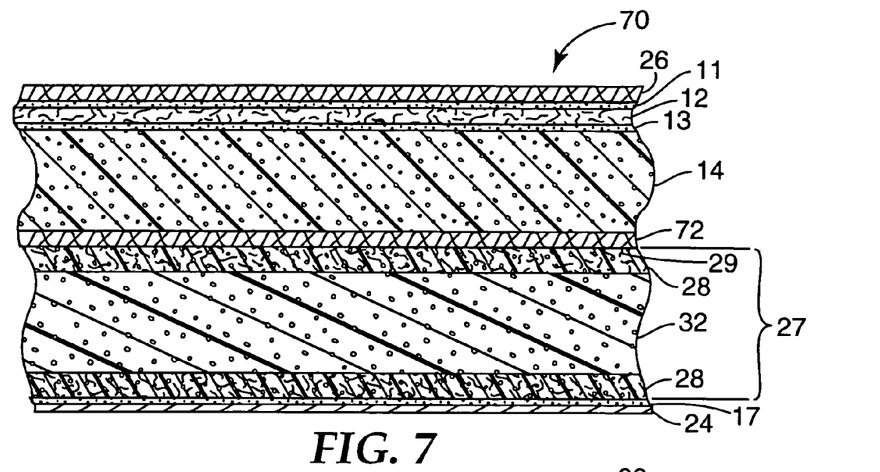
FIG. 7 is a side sectional view of the Example 1 sound absorptive composite.

The facing fabric was peeled away from the sample to expose an underlying open cell foam layer. The exposed foam was lightly coated with a misted layer of SUPER 77™ spray adhesive, commercially available from 3M Company, covered with a layer of the semipermeable airflow-resistive membrane, coated with another lightly coated mist layer of spray adhesive and covered with the original facing fabric layer. The resulting sound absorptive multilayer composite had a structure like composite 70 shown in FIG. 7. Facing fabric 26 had a 0.6 mm thickness, semipermeable airflow-resistive membrane 12 had a 0.6 mm thickness, foam layer 14 had a 3.9 mm thickness, thermoplastic spunbond scrim layer 72 had a 0.3 mm thickness, urethane-impregnated, chopped fiber glass filled core 27 had a 6 mm thickness and air-impermeable backing film 24 had a 0.3 mm thickness. Adhesive layers 11 and 13 had negligible thicknesses. The composite had a 10.8 mm cavity depth and an 11.7 mm total composite thickness, or a 92% ratio of cavity depth to total composite thickness. This composite was identified as Example 1 and evaluated for sound absorption at normal incidence as described above. The sound absorption results are shown as Curve 1 in FIG. 9, and demonstrate that a substantial sound absorption improvement could be obtained in an ostensibly fully engineered headliner assembly by adding a single semipermeable airflow-resistive membrane just below the fabric facing.

EXAMPLE 2

Figure 8:
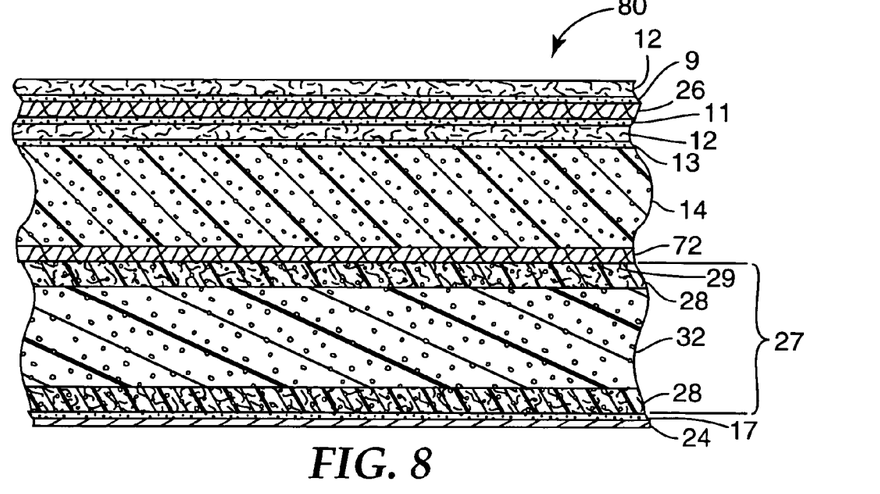
FIG. 8 is a side sectional view of the Example 2 sound absorptive composite.

The Example 1 composite facing fabric layer was lightly coated with another misted layer of spray adhesive and covered with a second layer of the semipermeable airflow-resistive membrane employed in Example 1. Acoustically, the result was like using a single, more airflow-resistive membrane. The resulting sound absorptive multilayer composite had a structure like composite 80 shown in FIG. 8. Adhesive layer 9 had a negligible thickness. The composite had an 11.7 mm cavity depth and an 12.3 mm total composite thickness, or a 95% ratio of cavity depth to total composite thickness. This composite was identified as Example 2 and evaluated for sound absorption at normal incidence using the method of Example 1. The sound absorption results are shown as Curve 2 in FIG. 9, and demonstrate that a further improvement in sound absorption could be obtained at lower frequencies by using a more airflow-resistive membrane.

EXAMPLE 3

A composite was prepared by swapping the locations of the semipermeable airflow-resistive membrane (membrane 12 in FIG. 7) and the open cell foam layer (foam 14 in FIG. 7) in the Example 1 composite so that the semipermeable airflow-resistive membrane was buried beneath the foam layer and thus further from the occupant side. A light mist coat of spray adhesive was used to reassemble the layers. The resulting composite was evaluated for sound absorption at normal incidence using the method of Example 1. This composite had a lower sound absorption coefficient (viz., poorer performance) than the Example 1 composite at all measured frequencies. The results are shown below in Table 1:

TABLE 1

| Frequency, Hz | Absorption Coefficient, Example 1 Composite | Absorption Coefficient, Composite with Membrane and Foam Layers Reversed |
| --- | --- | --- |
| 100 | 0.02 | 0.012 |
| 125 | 0.02 | 0.002 |
| 160 | 0.04 | 0.031 |
| 200 | 0.06 | 0.042 |
| 250 | 0.08 | 0.058 |
| 315 | 0.1 | 0.071 |
| 400 | 0.12 | 0.092 |
| 500 | 0.16 | 0.124 |
| 630 | 0.2 | 0.175 |
| 800 | 0.27 | 0.258 |
| 1 k | 0.35 | 0.33 |
| 1.25 k | 0.44 | 0.383 |
| 1.6 k | 0.52 | 0.421 |
| 2 k | 0.6 | 0.469 |
| 2.5 k | 0.66 | 0.538 |
| 3.15 k | 0.69 | 0.545 |

The results in Table 1 show that burying a semipermeable airflow-resistive membrane below a foam layer is much less effective than positioning the semipermeable air-resistive membrane near the occupant side.

EXAMPLE 4

Figure 11:
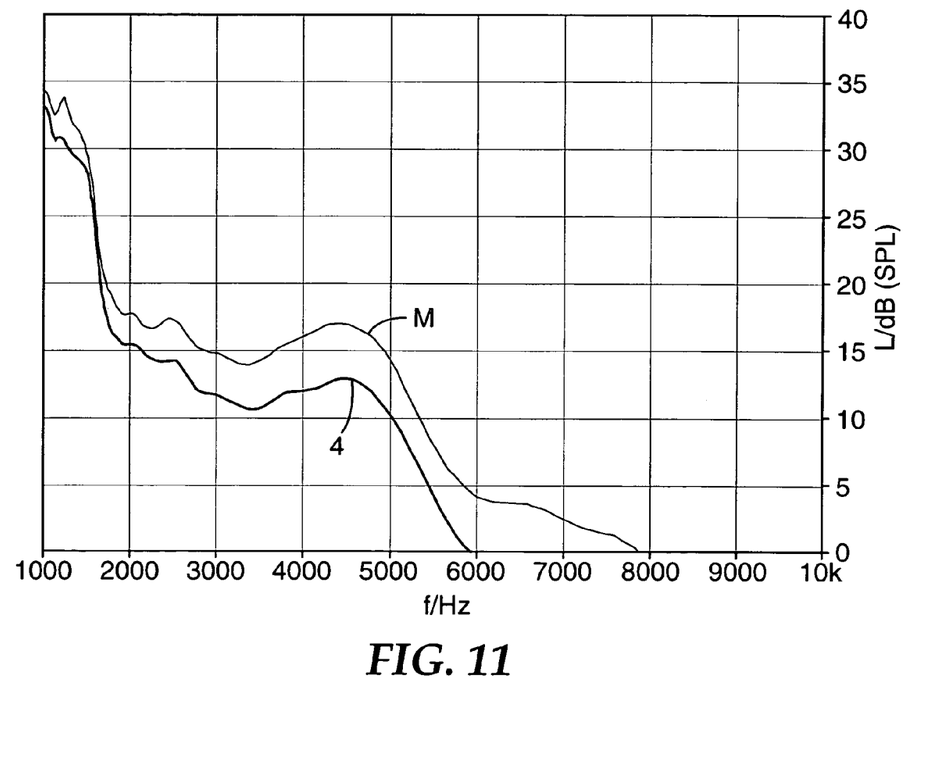
FIG. 11 is an in-vehicle graph of sound pressure vs. frequency for the Example 4 and Comparison Example M sound absorptive composites.

A second sample of the European luxury sport utility vehicle automotive headliner evaluated in Comparison Example M was obtained from the vehicle manufacturer. The entire facing fabric layer was carefully removed, measured to determine that it had an airflow resistance well below 100 mks Rayls, and discarded. The exposed open cell foam layer was lightly coated with a misted layer of spray adhesive and covered with the semipermeable airflow-resistive membrane employed in Example 1. A hot air gun was used to remove wrinkles. The completed headliner was identified as Example 4 and shipped back to the vehicle manufacturer for an in-vehicle noise comparison to the original equipment headliner. The noise comparison test was performed on a smooth surface track at 112 kilometers per hour, using a microphone placed near the driver's right ear. The results are shown in FIG. 11 as a plot of sound pressure level (SPL) vs. frequency. Curve M shows the original equipment noise level and curve 4 shows Example 4 headliner noise level. A very substantial 3 to 5 dB average reduction in SPL was obtained in a vehicle that had already been extensively engineered to achieve low road noise.

EXAMPLES 5-6 AND COMPARISON EXAMPLE H

The automotive headliner used in a Japanese luxury sedan was obtained from the vehicle manufacturer's U.S. subsidiary. A 63.5 mm diameter cylindrical sample was cut from the finished part, identified as Comparison Example H and evaluated for sound absorption using the method of Example 1. The sound absorption results are shown as Curve H in FIG. 12.

Figure 10:
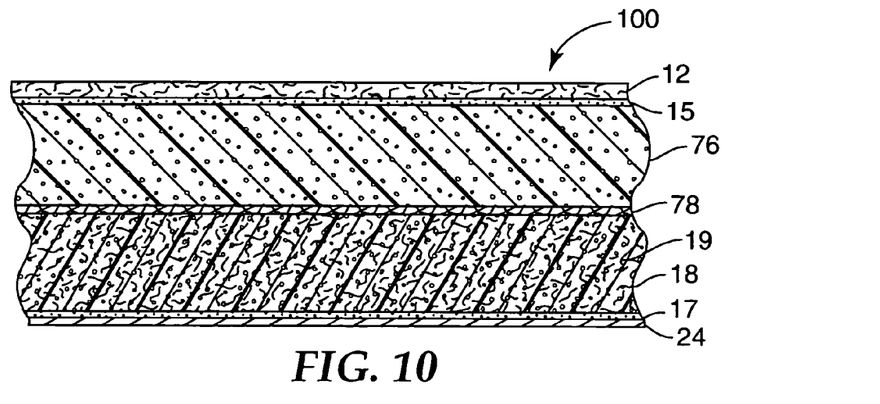
FIG. 10 is a side sectional view of the Example 4 sound absorptive composite.

Using the general method of Example 1, the facing fabric was peeled away from the sample to expose an underlying open cell foam layer. The exposed foam was lightly coated with a misted layer of spray adhesive and covered with a layer of the semipermeable airflow-resistive membrane employed in Example 1. The resulting sound absorptive multilayer composite had a structure like composite 100 shown in FIG. 10. Semipermeable airflow-resistive membrane 12 had a 0.6 mm thickness and an airflow resistance of 1,327 mks Rayls. Adhesive layers 15 and 78 had negligible thicknesses and their airflow resistance values were not determined. Foam layer 76 had a 5.2 mm thickness and an airflow resistance of 28 mks Rayls. Glass-filled polypropylene core 18 appeared to be made from AZDEL SUPER-LITE laminate, and had a 4 mm thickness and an airflow resistance of 210 mks Rayls. Air-impermeable backing film 24 had a 0.2 mm thickness. The composite had a 9.8 mm cavity depth and a 10 mm total composite thickness, or a 98% ratio of cavity depth to total composite thickness. This composite was identified as Example 5.

A further composite was prepared by lightly coating membrane 12 in Example 5 with a mist coat of spray adhesive and reapplying the original equipment facing fabric. The facing fabric had a 0.8 mm thickness and an airflow resistance of 79 mks Rayls. The resulting composite had a 9.8 mm cavity depth and a 10.8 mm total composite thickness, or a 91% ratio of cavity depth to total composite thickness. This composite was identified as Example 6.

Figure 12:
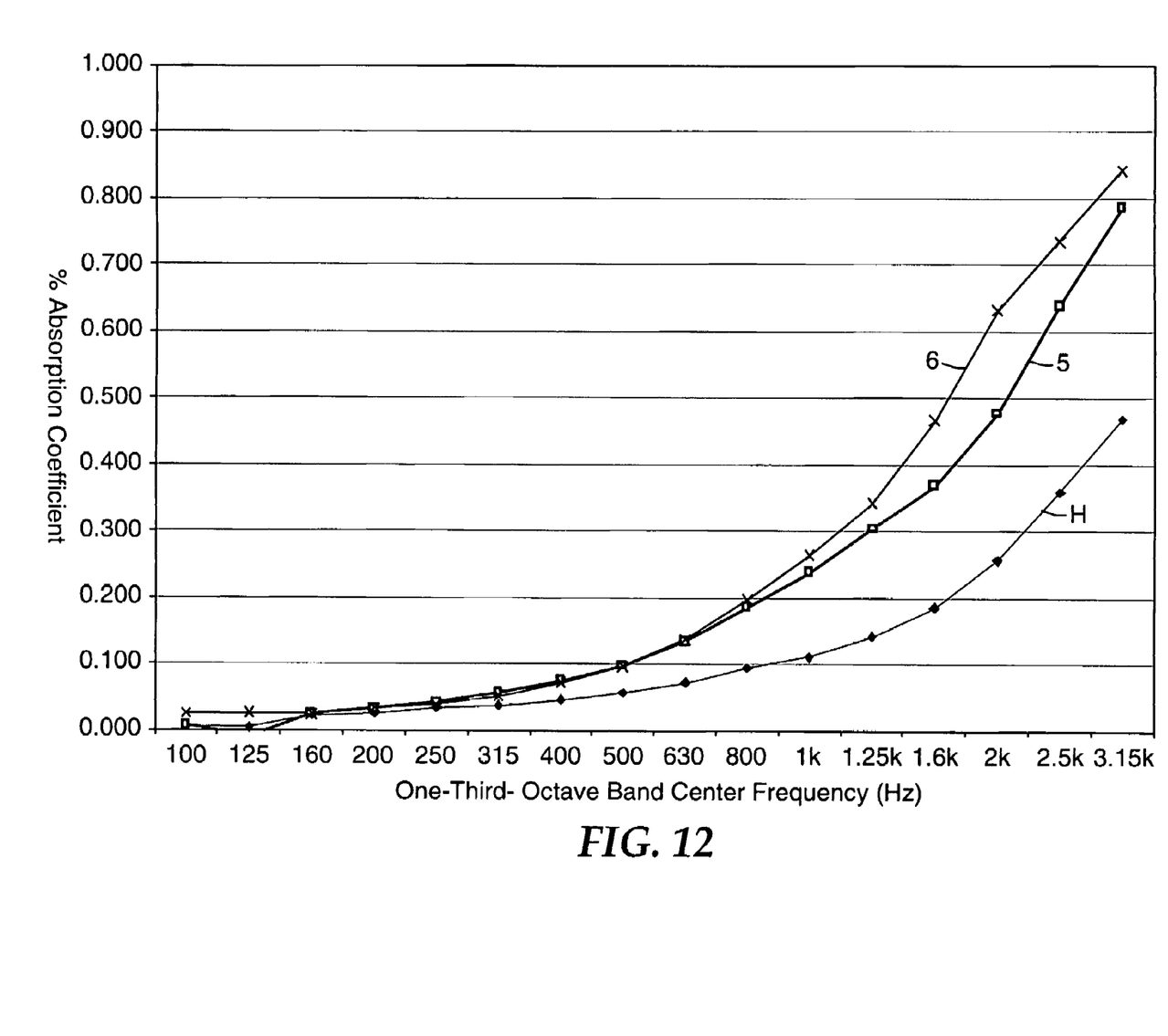
FIG. 12 is a graph of sound absorption vs. frequency for the Example 5, Example 6 and Comparison Example H sound absorptive composites.

The Example 5 and Example 6 composites were evaluated for sound absorption using the method of Example 1, and are respectively shown as Curve 5 and Curve 6 in FIG. 12. A comparison to Curve H shows that substantial sound absorption improvements were obtained in an ostensibly fully engineered headliner assembly by adding a single semipermeable airflow-resistive membrane at the occupant side or just below a fabric facing.

EXAMPLE 7 AND COMPARISON EXAMPLE T

The headliner used in a U.S. manufactured full size Japanese pickup truck was obtained from the vehicle manufacturer. Cylindrical samples were cut from the headliner and identified as Comparison Example T. A sample was dissected to reveal the individual sample layers. From the occupant side toward the vehicle side, these layers were a nonrestrictive facing fabric; an open cell foam; an adhesive-coated polyethylene air-impermeable barrier film; an air-permeable reinforcing core; and an air-impermeable barrier film. The headliner thus employed an impermeable barrier film on each side of the reinforcing core, apparently to prevent adhesive migration from the core towards the occupant side. This however prevented the reinforcing core from contributing to interior sound absorption. The headliner also lacked a semipermeable airflow-resistive membrane, thus further limiting the potential interior sound absorption. The headliner could be significantly improved by 1) replacing the nonrestrictive facing fabric with a semipermeable airflow-resistive decorative membrane like those described above, or laminating a semipermeable airflow-resistive nondecorative or decorative membrane immediately beneath the facing fabric, and 2) replacing the reinforcing core's occupant side barrier film with a semipermeable airflow-resistive membrane whose material, topography, surface energy or other relevant characteristics would adequately discourage adhesive migration. These steps would more than double the acoustic cavity depth, would enable the reinforcing core to contribute to interior sound absorption, and would substantially increase sound absorption and reduce interior sound pressure levels.

Figure 13:
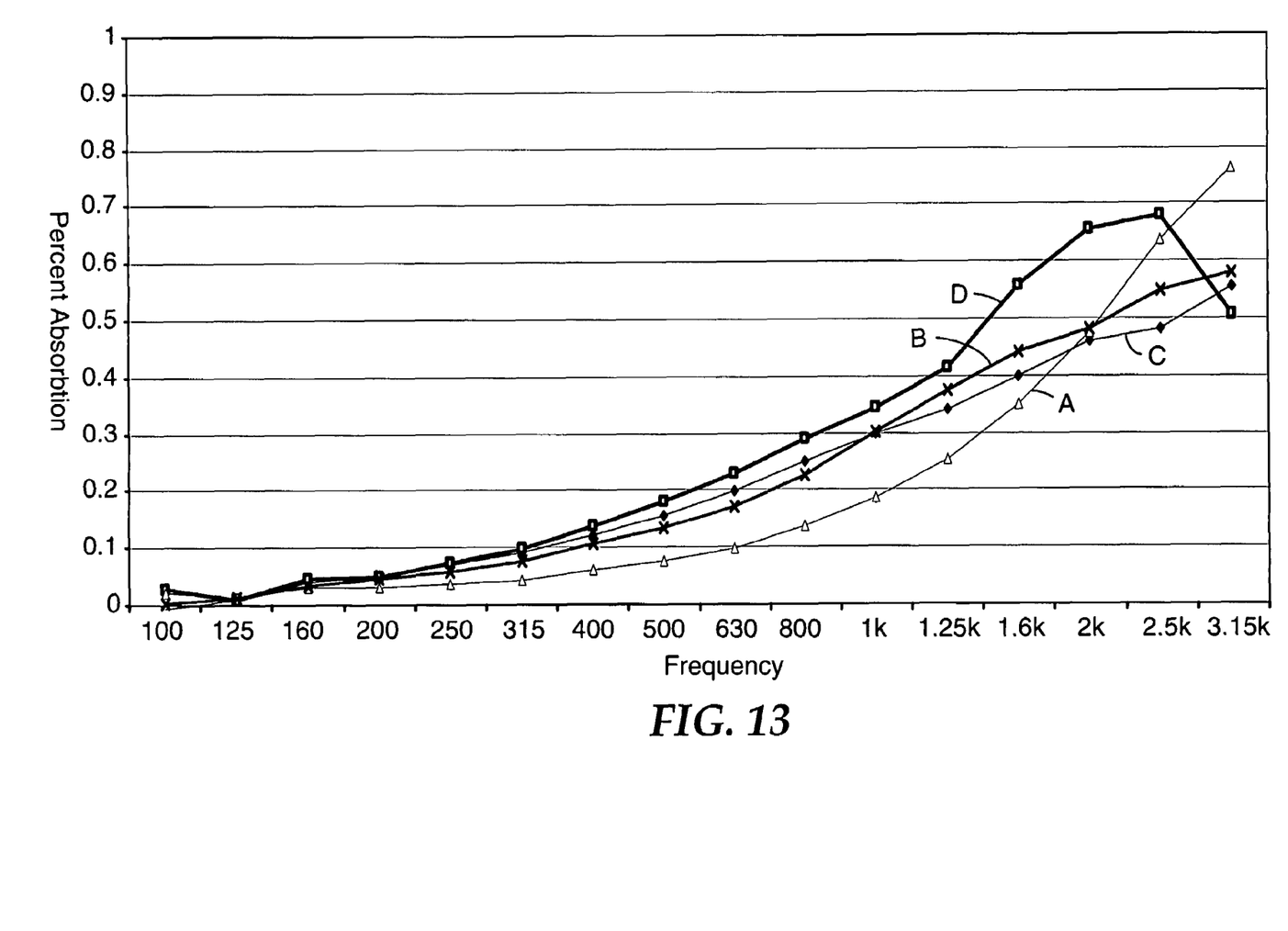
FIG. 13 is a graph of sound absorption vs. frequency for the Example 7 sound absorptive composites.

A series of modified headliner samples was prepared by initially removing the reinforcing core's occupant side barrier film. A first modified sample was prepared by re-adhering the core and foam together using a light mist coat of spray adhesive. This first sample potentially might exhibit eventual adhesive migration. It was prepared to demonstrate the acoustic benefit that could be obtained by removing the buried barrier film layer and thereby providing an air pathway to the reinforcing core. Curve A in FIG. 13 shows the sound absorption of the resulting modified headliner sample when evaluated for sound absorption using the method of Example 1. This modified sample had much better sound absorption than the unmodified sample represented by Comparison Example T, whose sound absorption is not shown in FIG. 13.

A second modified sample was prepared by coating one side of a semipermeable airflow-resistive membrane like that described in Example 1 with a thermoplastic copolyester adhesive at a 20 g/m$^2$ coating weight, and placing the membrane between the reinforcing core and foam with the adhesive side facing the foam. The core contained a urethane resin that when heated could adhere the core to the membrane. The resulting assembly of layers was heat-laminated to form a unitary composite. Curve B in FIG. 13 shows the sound absorption of the resulting modified headliner sample. This modified sample had much better sound absorption than the Curve A sample or the unmodified sample represented by Comparison Example T.

A third modified sample was prepared using two layers of the semipermeable airflow-resistive membrane between the reinforcing core and foam. Curve C in FIG. 13 shows the sound absorption of the resulting modified headliner sample. This modified sample had much better sound absorption than the Curve A sample or the unmodified sample represented by Comparison Example T. The Curve C sample had somewhat better performance than the Curve B sample at lower frequencies and somewhat lower performance than the Curve B sample at higher frequencies.

A fourth modified sample was prepared using one layer of the semipermeable airflow-resistive membrane between the nonrestrictive facing fabric and the open cell foam, and a second layer of the semipermeable airflow-resistive membrane between the reinforcing core and foam. Curve D in FIG. 13 shows the sound absorption of the resulting modified headliner sample. Over most of the measured frequency range this modified sample had substantially better sound absorption than all the other samples and the unmodified sample represented by Comparison Example T.

Various modifications and alterations of this invention will be apparent to those skilled in the art without departing from the scope and spirit of this invention. This invention should not be restricted to that which has been set forth herein only for illustrative purposes.

The invention claimed is:

1. A method for making a multilayer sound absorptive composite comprising:
    a) providing a stack of layers comprising in order an air-impermeable barrier, an air-permeable reinforcing core comprising a foam and having an airflow resistance of at least about 100 miks Rayls and a thickness at least about ⅓ the final composite thickness, an air-permeable open cell foam or fibrous pad having an airflow resistance less than about 2000 miks Rayls and a thickness at least about 1/10 the final composite thickness, and a semipermeable airflow-resistive membrane having an airflow resistance of about 500 to about 4000 miks Rayls, and
    b) laminating the stack of layers together under sufficient heat and pressure to form a unitary sound absorptive multilayer composite.

2. A method according to claim 1 wherein the composite has a cavity depth at least 90% of the total composite thickness, with the cavity depth being measured from the air-impermeable barrier innermost side to the membrane outermost side.

3. A method according to claim 1 wherein the composite has a cavity depth at least 95% of the total composite thickness, with the cavity depth being measured from the air-impermeable barrier innermost side to the membrane outermost side.

4. A method according to claim 1 wherein the membrane has an airflow resistance of about 500 to about 1500 miks Rayls.

5. A method according to claim 1 wherein the membrane is an outermost layer of the composite.

6. A method according to claim 1 wherein the membrane is colored or textured to provide a decorative appearance.

7. A method according to claim 1 wherein the membrane comprises a nonwoven web.

8. A method according to claim 1 wherein the membrane comprises knit or woven fabric comprising microdenier yarns.

9. A method according to claim 1 wherein the membrane comprises multicomponent fibers.

10. A method according to claim 1 wherein the membrane comprises split or splittable bicomponent fibers.

11. A method according to claim 1 wherein the foam or fibrous pad has a thickness at least about ¼ the total composite thickness.

12. A method according to claim 1 wherein the foam or fibrous pad has a thickness at least about ½ the total composite thickness.

13. A method according to claim 1 wherein the foam or fibrous pad has an airflow resistance less than about 500 miks Rayls.

14. A method according to claim 1 wherein the core has a thickness less than about ⅔ the total composite thickness.

15. A method according to claim 1 wherein the core has a thickness less than about ½ the total composite thickness.

16. A method according to claim 1 wherein the core has an airflow resistance less than about 2000 miks Rayls.

17. A method according to claim 1 wherein the stack further comprises an outermost nonrestrictive air-permeable decorative layer adjacent the membrane.

* * * * *